Figure 1:
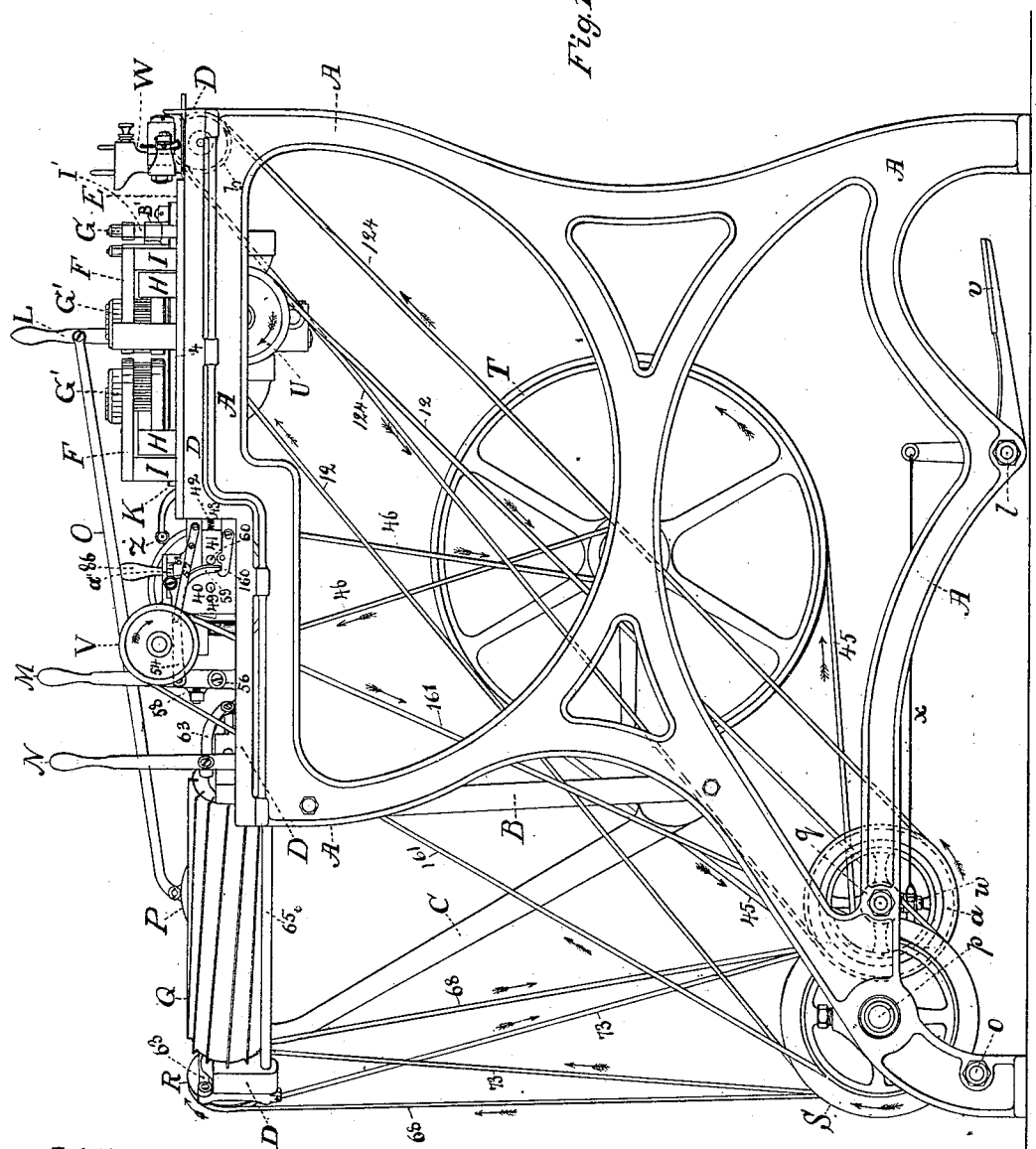

(No Model.) 14 Sheets—Sheet 1.

C. H. WILLCOX.
MACHINE FOR CLIPPING LACE, &c.

No. 353,615. Patented Nov. 30, 1886.

Witnesses:
C. J. Hedrick
Philip Mauro

Inventor:
Charles H. Willcox
per A. Pollok
his Attorney (No Model.) 14 Sheets—Sheet 4.

C. H. WILLCOX.
MACHINE FOR CLIPPING LACE, &c.

No. 353,615. Patented Nov. 30, 1886.

Witnesses:
C. J. Hedrick
Philip Mauro

Inventor:
Charles H. Willcox
per A. Pollok
his Attorney (No Model.) 14 Sheets—Sheet 5.
C. H. WILLCOX.
MACHINE FOR CLIPPING LACE, &c.
No. 353,615. Patented Nov. 30, 1886.
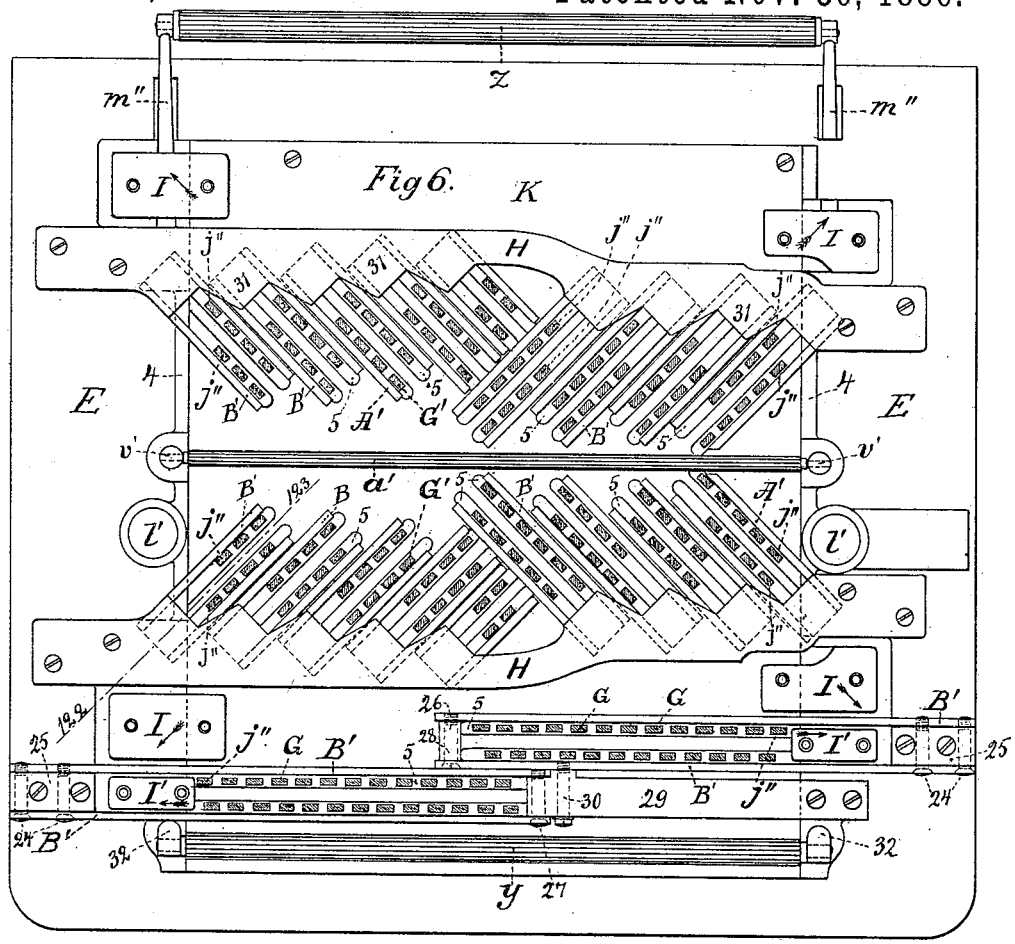
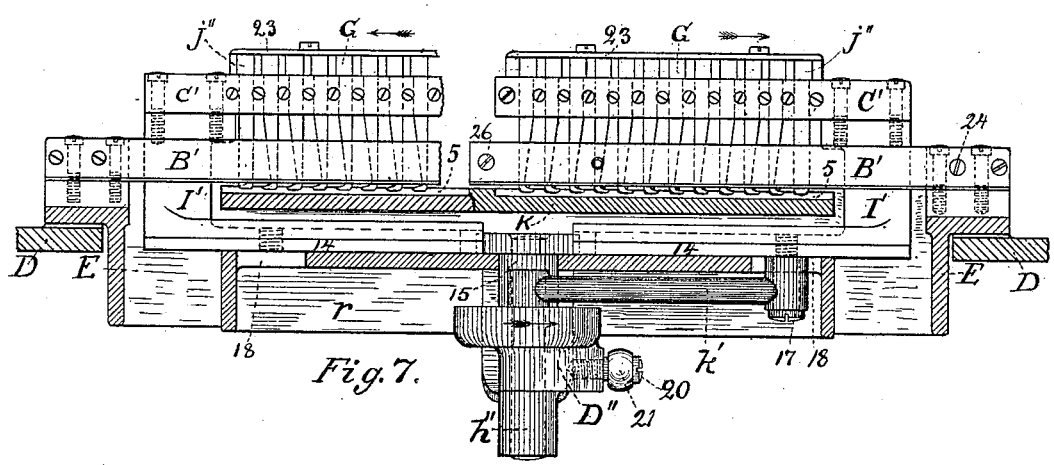
Witnesses:
C. J. Hedrick
Philip Mauro
Inventor
Charles H. Willcox
per A. Pollok his
Attorney (No Model.) 14 Sheets—Sheet 6.
C. H. WILLCOX.
MACHINE FOR CLIPPING LACE, &c.
No. 353,615. Patented Nov. 30, 1886.
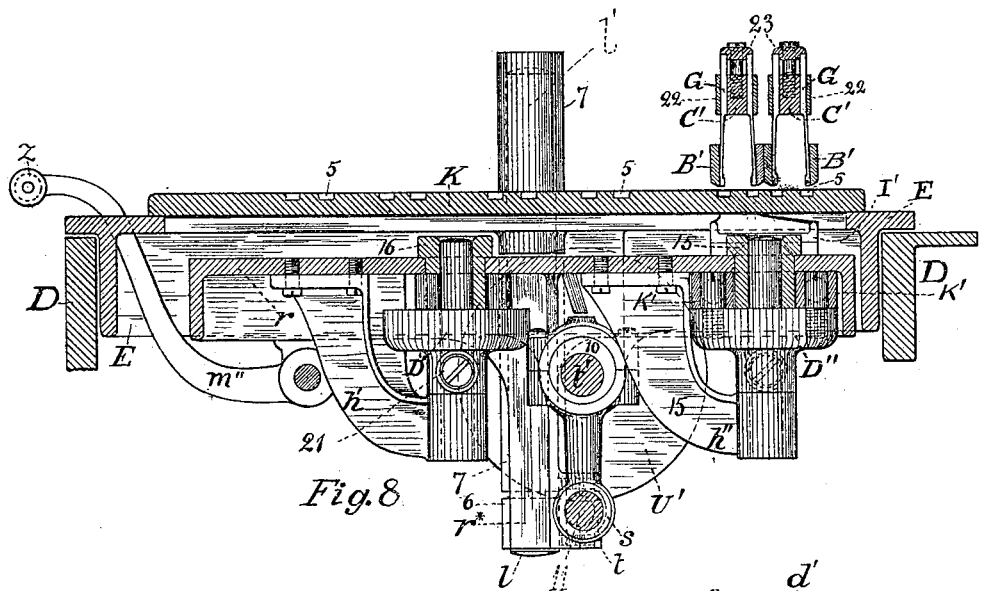
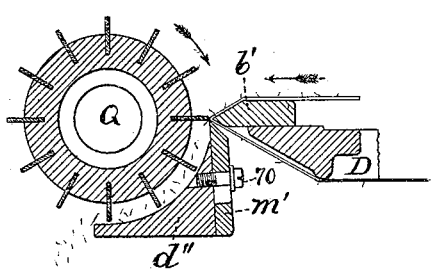
Fig. 9
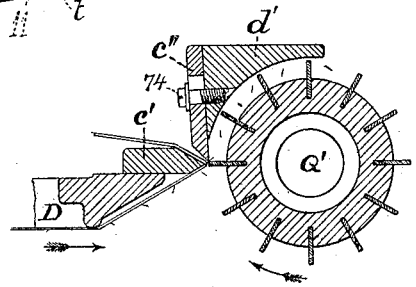
Fig. 10
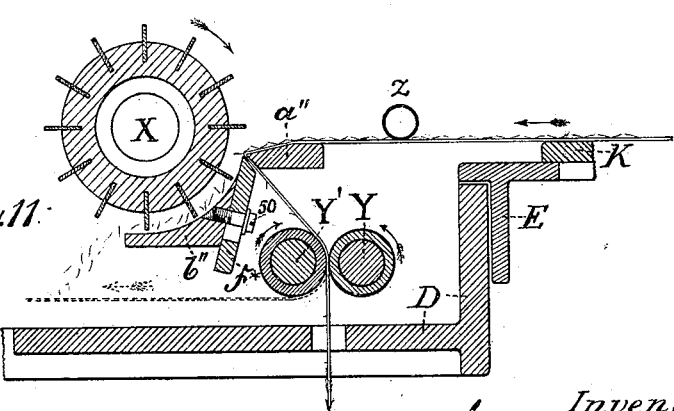
Fig. 11
Witnesses:
C. J. Hedrick
Philip Mauro
Inventor:
Charles H. Willcox
per A. Pollok his
Attorney (No Model.)    14 Sheets—Sheet 7.

C. H. WILLCOX.
MACHINE FOR CLIPPING LACE, &c.

No. 353,615.    Patented Nov. 30, 1886.

Witnesses:    Inventor:
C. J. Hedrick    Charles H. Willcox
Philip Mauro    per A. Pollok
              his Attorney N. PETERS, Photo-Lithographer, Washington, D. C.

(No Model.) 14 Sheets—Sheet 8.

C. H. WILLCOX.
MACHINE FOR CLIPPING LACE, &c.

No. 353,615. Patented Nov. 30, 1886.

Witnesses:
C. J. Hedrick
Philip Mauro

Inventor:
Charles H. Willcox
per A. Pollok
his Attorney (No Model.)
14 Sheets—Sheet 9.
C. H. WILLCOX.
MACHINE FOR CLIPPING LACE, &c.
No. 353,615. Patented Nov. 30, 1886.
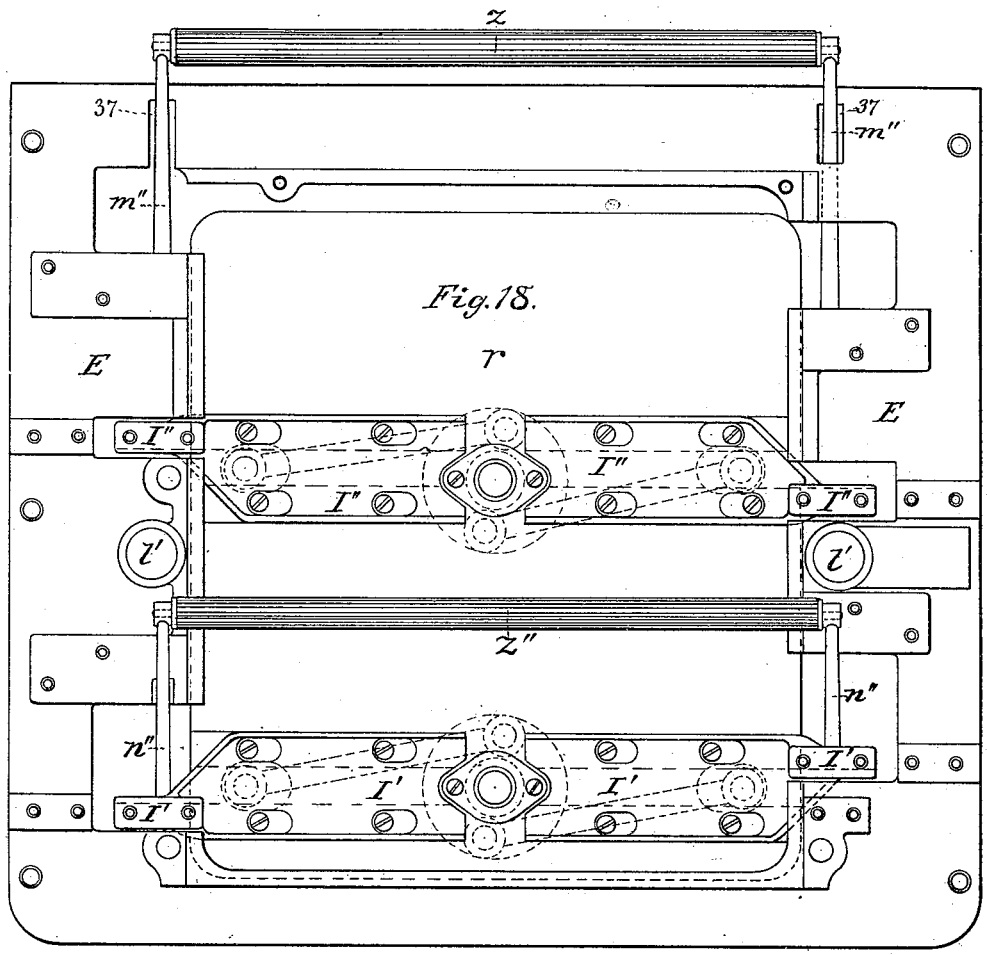
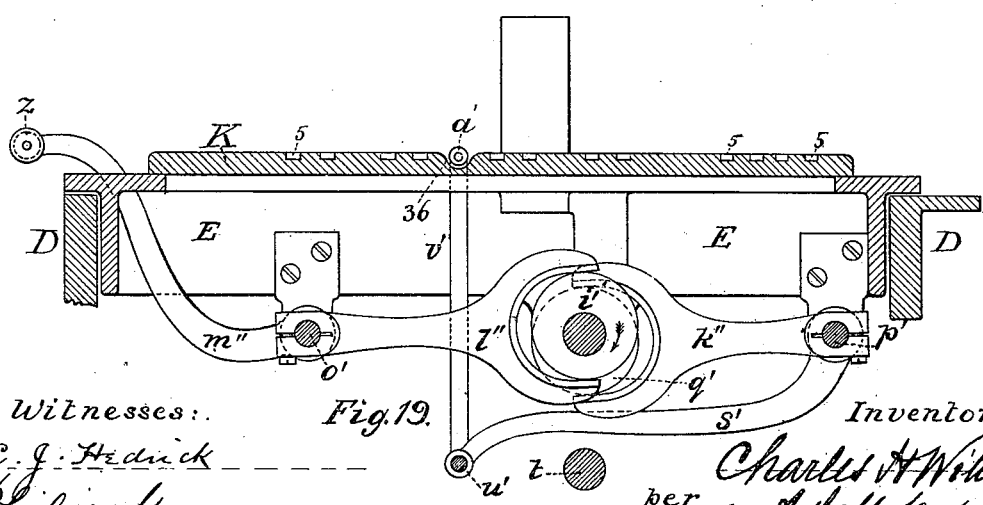
Witnesses: C. J. Hedrick
Philip Mauro
Inventor: Charles H. Willcox
per A. Pollok his Attorney (No Model.)　　　　　　　　　　　　　　　　14 Sheets—Sheet 10.
C. H. WILLCOX.
MACHINE FOR CLIPPING LACE, &c.

No. 353,615.　　　　　　　　　　Patented Nov. 30, 1886.

Witnesses.
C. J. Hedrick
Philip Mauro

Inventor.
Charles H. Willcox
per A. Pollok
his Attorney.

(No Model.) 14 Sheets—Sheet 11.
C. H. WILLCOX.
MACHINE FOR CLIPPING LACE, &c.

No. 353,615. Patented Nov. 30, 1886.

Witnesses:
C. J. Hedrick
Philip Mauro

Inventor:
Charles H. Willcox
per A. Pollok
his Attorney.

(No Model.)

C. H. WILLCOX.
MACHINE FOR CLIPPING LACE, &c.

No. 353,615.

14 Sheets—Sheet 12.

Patented Nov. 30, 1886.

Witnesses.
C. J. Hedrick
Philip Maure

Inventor:
Charles H. Willcox
per A. Pollok
his Attorney.

(No Model.) 14 Sheets—Sheet 13.

C. H. WILLCOX.
MACHINE FOR CLIPPING LACE, &c.

No. 353,615. Patented Nov. 30, 1886.

Witnesses:
C. J. Hedrick
Philip Mauro

Inventor:
Charles H. Willcox
per A. Pollok
Attorney.

(No Model.)　　　　　　　　　　　　　　　　14 Sheets—Sheet 14.
C. H. WILLCOX.
MACHINE FOR CLIPPING LACE, &c.

No. 353,615.　　　　　　　　　　　Patented Nov. 30, 1886.

Witnesses:
C. J. Hedrick
Philip Mauro

Inventor
Charles H. Willcox
per A. Pollok
his Attorney.

UNITED STATES PATENT OFFICE.

CHARLES H. WILLCOX, OF NEW YORK, N. Y.

MACHINE FOR CLIPPING LACE, &c.

SPECIFICATION forming part of Letters Patent No. 353,615, dated November 30, 1886.

Application filed February 5, 1885. Serial No. 155,024. (No model.) Patented in Germany January 17, 1885, No. 33,937; in England January 20, 1885, No. 837; in France November 4, 1885, No. 172,262, and in Belgium November 4, 1885, No. 70,731.

*To all whom it may concern:*

Be it known that I, CHARLES H. WILLCOX, of New York city, in the county and State of New York, have invented a new and useful Improvement in Machines for Clipping Lace and other Fabric, (which has been patented in Great Britain by Letters Patent No. 837, dated January 20, 1885; in France by Patent No. 172,262, dated November 4, 1885; in Belgium by Patent No. 70,731, dated November 4, 1885, and in Germany by certificate of addition to Patent No. 33,937, dated January 17, 1885,) which improvement is fully set forth in the following specification.

This invention relates to machinery for removing from machine lace or figured bobbinet or similar fabric the loose threads (called "floating threads," "floats," or "clips") which connect the figures of the lace.

Heretofore different forms of machines have been devised for that purpose.

The present invention is more particularly designed as an improvement upon that form in which movable pickers enter between the loose threads and the body of the fabric, lift the same, and cut them with the aid of a stationary co-operating blade, and in which additional cutting mechanism afterward mows off the threads close to the body of the fabric, said threads being caused to stand out from the fabric by bending the latter around the edge of a plate or bar.

Heretofore the pickers have been given a movement directly at right angles to the movement of the fabric. In many kinds or figures of lace (bobbinet) the loose threads run in such a way that the pickers acting directly across the fabric could hardly enter under them, and thus they would be apt to escape cutting. In the present invention one or more series of pickers are disposed more or less obliquely, so as to move in planes more or less oblique to the movement of the fabric; also, in order to clip properly lace with the loose or floating threads running in a variety of directions, two or more series of pickers arranged at different angles are employed, so that one or more series of pickers will act at right angles, or approximately at right angles, to every loose thread, no matter what its direction may be.

A difficulty similar to that of cutting the thread by the pickers when they lie at different angles on the fabric is encountered in mowing off the threads when cut. To overcome this difficulty, mechanism comprising cutters and throat-plates for mowing off the cut threads is arranged obliquely to the movement of the fabric, which movement is altered or changed in direction as the fabric passes around the edge of the obliquely-disposed throat-plate; also, for clipping lace whereon the loose threads run in a number of different directions, two or more mowing mechanisms are employed, they being arranged at an angle one to the other, so that one or another of the edges over which the lace or fabric is drawn will be at right angles or nearly at right angles to every thread, no matter what its direction on the lace may be. The mowing off of all the threads will thus be secured.

The pickers, in order to lift the threads, press down the body of the lace into slots or grooves. To supply loose lace which can be taken in without injuriously stretching the fabric, a take-up is provided consisting of a bar operated at proper intervals, so as to draw in or take up a certain quantity of lace when the pickers are out of action, and to release the fabric thus drawn in when the pickers descend and force the fabric into the grooves. It is found desirable to use continuously instead of intermittently acting feed-rolls. When, however, the pickers are acting on the fabric, the feed of the fabric is necessarily stopped. To supply the lace to the feed-rolls at this time, so that they will not stretch the fabric, a take-up (similar to the one before referred to) is provided.

In order to feed the lace through the machine, two sets of feed-rolls are employed—one set just after the pickers and first or cross mowing mechanism, and another set after the diagonal mowing mechanism. In order that the latter set may not only feed the fabric, but also keep it taut in passing through the mowing mechanism, these rolls are driven at a slightly greater speed than those of the first set, and that they may not tear but only keep tight the lace they are driven by means of friction, (adjustable to produce more or less tension on the fabric,) so that when the lace is properly stretched the parts in frictional contact will slip. It is preferred to connect the driving-shafts of the two pairs of rolls with each other, so as to revolve in equal times, and to secure the differential action by making the driving-roll in one set larger than in the other, so as to have a correspondingly greater surface speed. This larger roll is preferably made of a sleeve journaled on the driving-shaft, and connected therewith by friction-plugs set in radial holes, which plugs are pressed against the shaft by screws tapped into the outer ends of the holes.

The present invention also comprises new mechanism for supporting and operating the pickers. Heretofore these were secured to a stationary support and operated independently. In the present invention a series of pickers are fastened to a common support, and the proper motions are given to this support, so that the series of pickers are operated simultaneously by one mechanism. This common support is preferably an arm attached at the end to a slide and overhanging the grooved lace-plate over which the lace or fabric is drawn. The slide or slides (for preferably there are a number of slides, each having its own series of pickers) are mounted on ways in a movable bed, which is given a vertical movement of reciprocation by eccentrics and links, the slides being reciprocated on the bed by means of a wrist-plate or wrist-plates connected by links with the slides, and by another link or links with an eccentric or eccentrics for vibrating the wrist-plate or wrist-plates. The eccentrics are so arranged that the pickers have a movement downward to push the body of the lace into the groove, causing the loose threads to buckle up, then outward to insert their lifting-fingers under the loose threads, then upward, then inward into position for a new operation. The lifting-fingers are provided with a cutting-edge on top, so that as the pickers are lifted the loose threads are cut. To assist in cutting the threads, a stationary blade is placed above the fabric to co-operate with the cutting-pickers, giving the action of shears. In the present invention a single stationary blade having the cutting-edge at the bottom is placed alongside a series of cutting-pickers, instead of having a separate stationary blade for each picker. The stationary blades (for several are employed, each co-operating with a series of pickers) are fastened to blocks or brackets in the picker-frame at the side of the lace-plate which they overhang.

In the improved machine made according to the present invention, enough pickers are employed to cover every part of the fabric as it passes by, and they are arranged so as to lift and cut every thread. The feed is slow, so that each picker has a fair chance of entering under every uncut thread which comes within its reach. Six slides, each carrying a double row of pickers, the pickers in each single row being opposite the spaces between pickers of the adjacent row, and being in line with one another, so that the heel of one picker acts as a guard to the point of the picker behind, are preferably employed. The slides are arranged in pairs, one slide on each side of the center line of the lace, which slides are moved simultaneously in opposite directions, the lifting-fingers on the two slides of a pair pointing in opposite directions—that is to say, toward the edge of the lace. As the mesh of the lace, as well as the length of the loose threads, is different in different figures of lace, it is desirable to have the pickers with lifting-fingers of different width.

The means for holding the pickers are so arranged that one size of picker can be substituted for another, the shanks which fit in the sockets of the overhanging arms being of the same size. Each picker consists preferably of a shank, an elastic and flexible middle portion, and a lifting-finger provided with a cutting-edge. Each double row of spring-pickers is inclosed between a pair of stationary blades, the elasticity of the middle portion of each picker holding the cutting-edge against that of the stationary blade. The pressure due to this elasticity being in the opposite direction in one row from what it is in the other, the side pressure upon the support or overhanging arm is balanced, and therefore practically eliminated. In the mowing mechanism the throat-plate is movable toward and away from the moving cutters, (composed of a stationary or ledger blade and a rotary cutter, the latter composed of a cylinder with a number of blades set spirally therein,) in order to facilitate the insertion of the lace in the machine. The throat-plate is also adjustable toward and away from the mowing-cutter, in order to regulate the closeness of the cut to the surface of the lace. The stationary blades of the mowing mechanism are adjustable.

Mechanism is provided for separating and holding apart the feed-rolls for readily introducing the fabric. That for separating one set of feed-rolls is connected with that for moving away one of the throat-plates.

In order to stitch together different lengths of lace, so that one will draw the succeeding one into the clipping-machine, a sewing-machine is supported in slides on the front of the clipping-machine frame, and it is so constructed and arranged that it can be fed across the lace (whose ends are overlapped) to stitch the two layers together. The feeding is in the direction of the goose-neck and needle-lever of the sewing-machine, whose length equals the width of the lace to be united, or is sufficient to allow the sewing-machine to act over the whole width. The shaft of the sewing-machine is formed of a sleeve and a core connected by a spline and groove, the sleeve being journaled in the sliding frame of the sewing-machine and carrying the looper and eccentric for operating the needle-bar, while the core is journaled in bearings of the clipping-machine frame and is revolved by a suitable belt on a pulley fixed on said core.

The sleeve is screw-threaded on the outside and engages a stationary nut, so that as the sleeve revolves to form the stitches it also feeds along the whole machine by its engagement with the stationary nut. When the sewing-machine has finished its traverse, the nut is opened and the machine run back by hand. A slotted plate forms the throat-plate of the sewing-machine, the slot being the full length of the traverse of the machine.

Pedals and connected mechanism are provided for stopping and starting the clipping-machine; also for stopping and starting the sewing-machine. The latter is driven from a loose pulley, onto which the belt for driving the clipping-machine is shipped when said machine is to be stopped, so that the sewing-machine can never be brought into action while the clipping-machine is in motion. In the clipping-machine there is an adjustable guide-piece for keeping the lace in line as it is drawn from one oblique throat-plate to the other.

The accompanying drawings, which form a part of this specification, represent a lace-clipping machine constructed in accordance with the invention.

Figure 2:
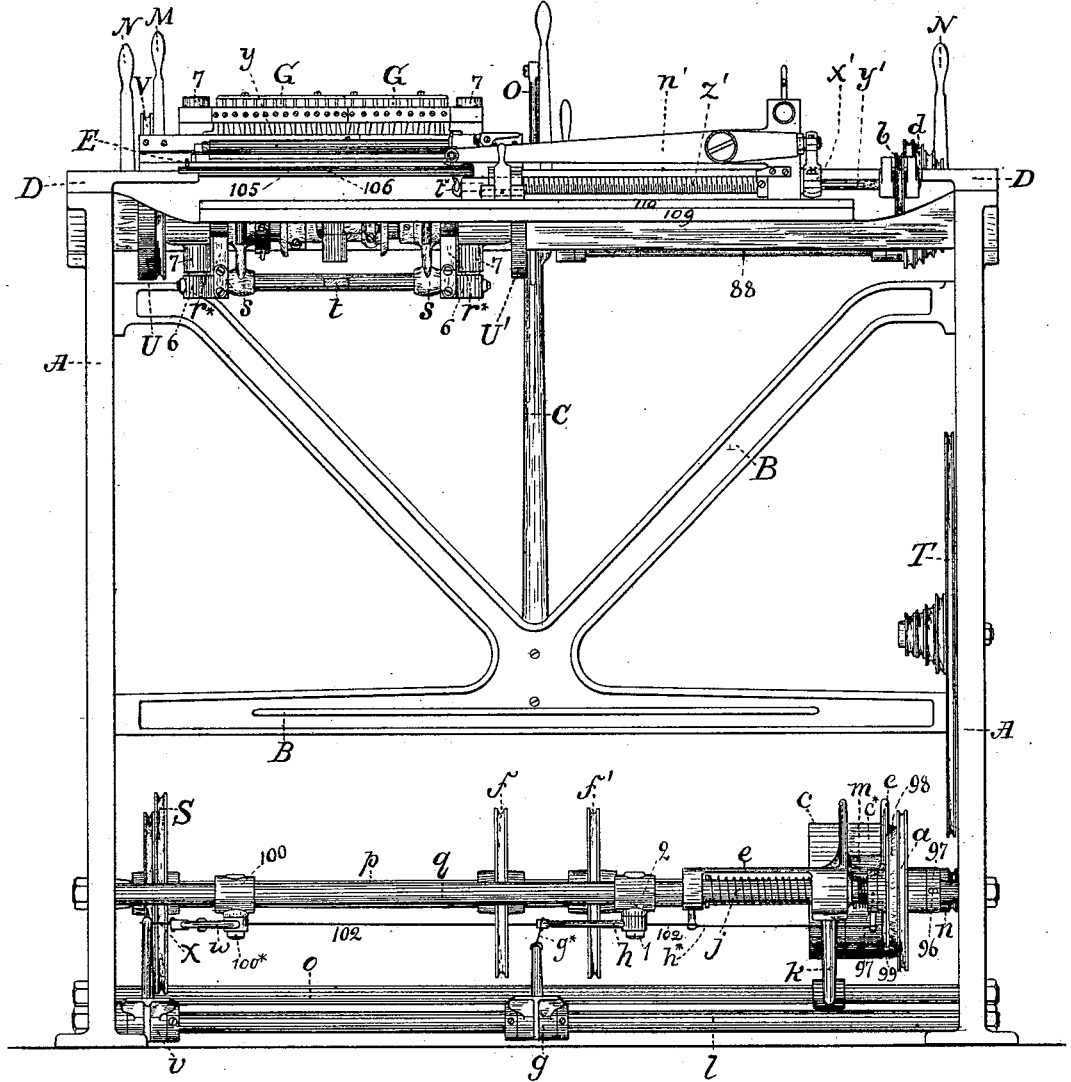
Figure 3:
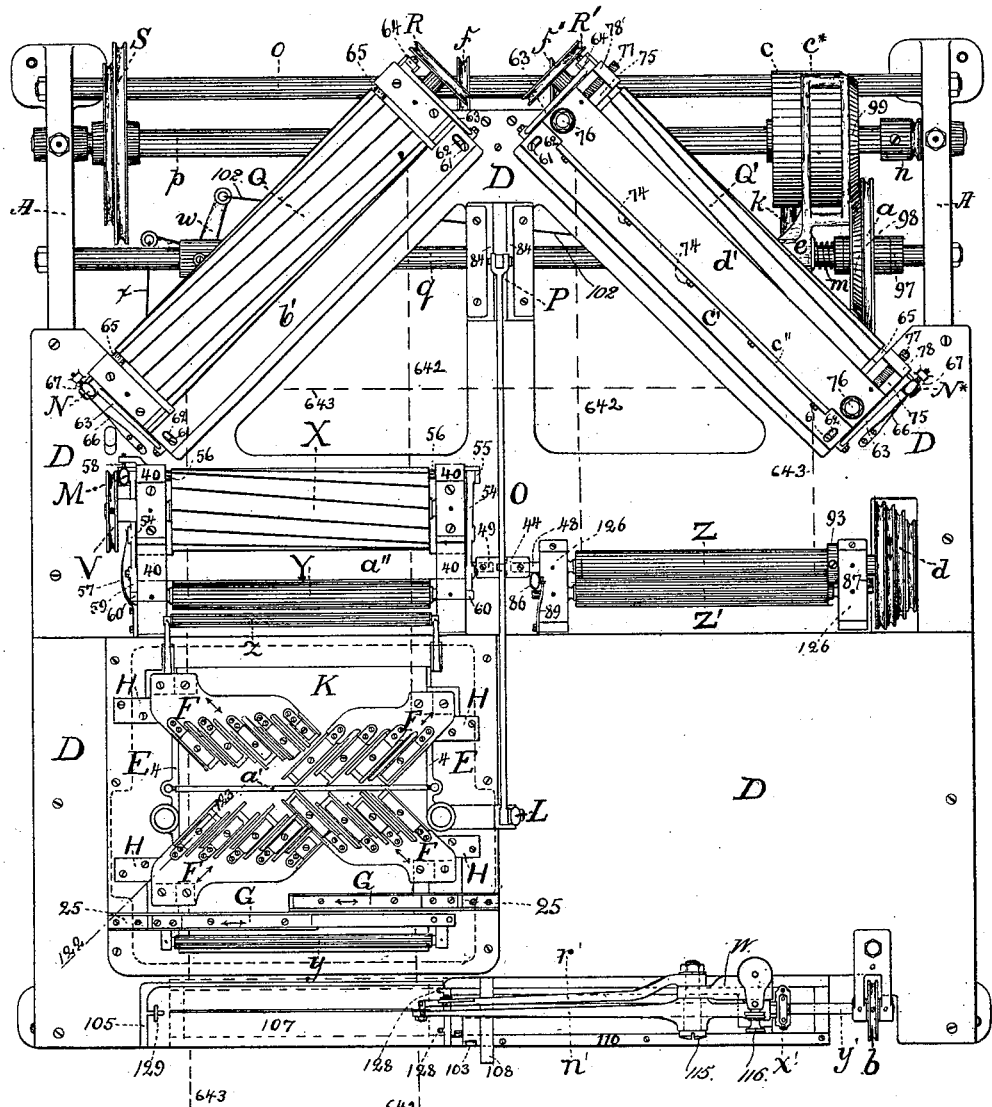
Figure 4:
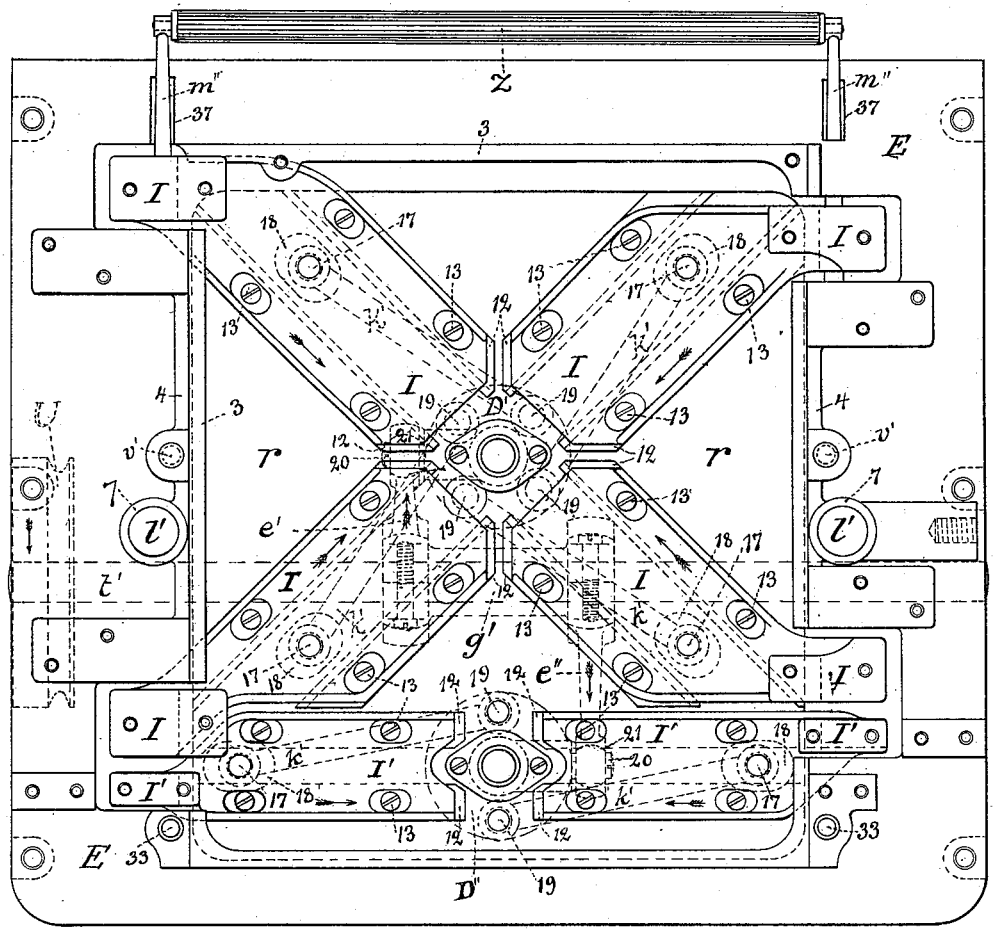
Figure 5:
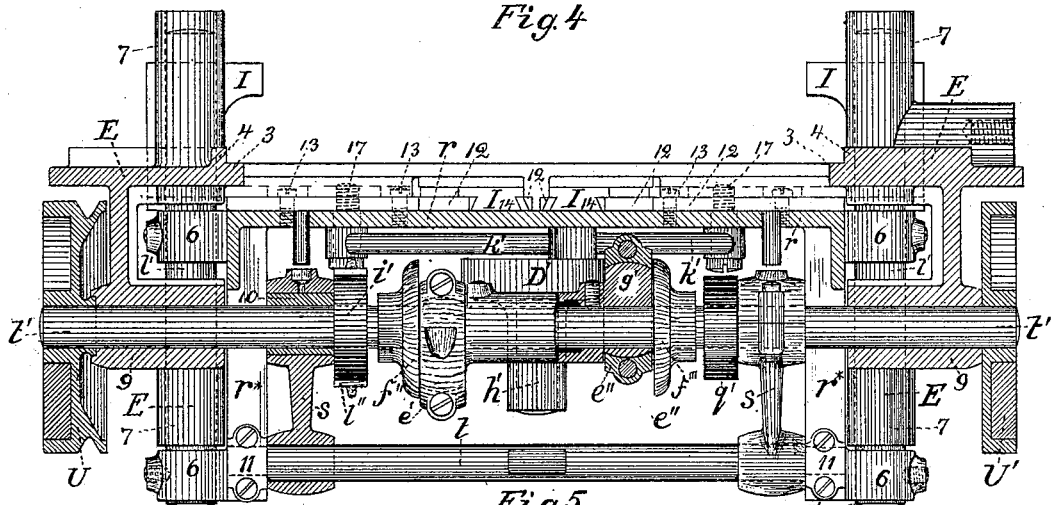
Figure 12:
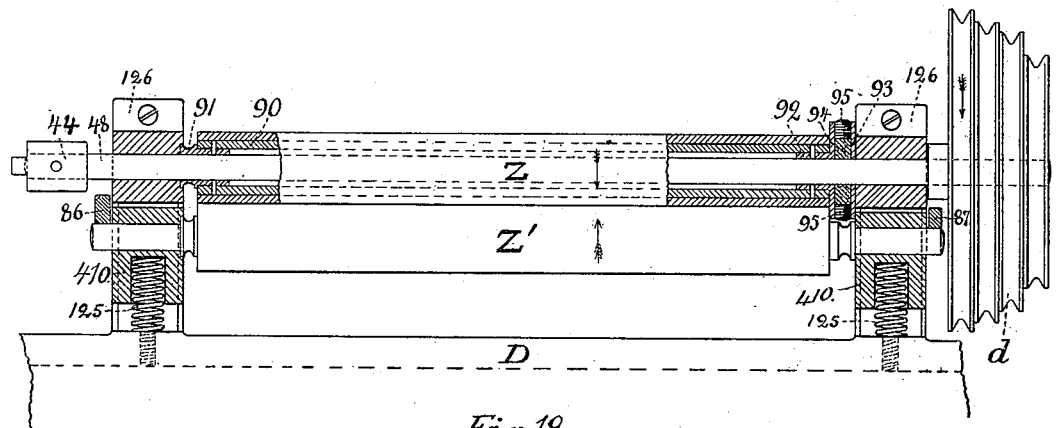
Figure 13:
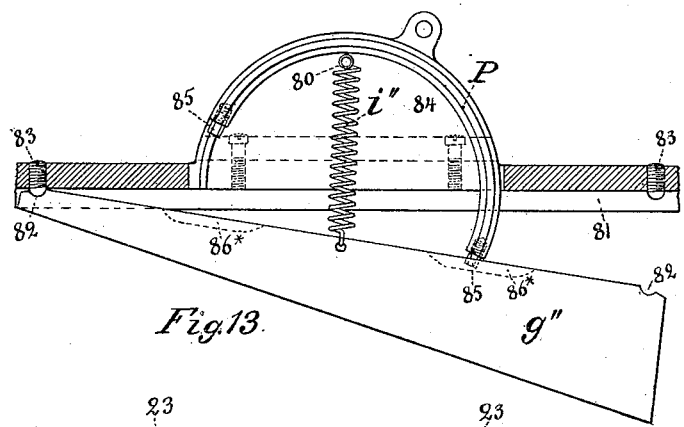
Figures 14, 15:
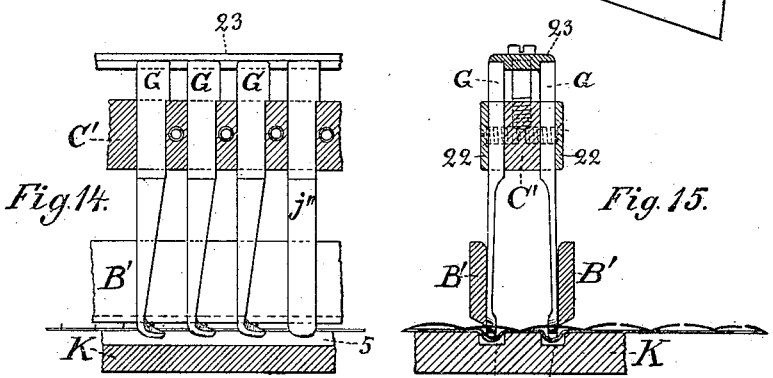
Figure 16:
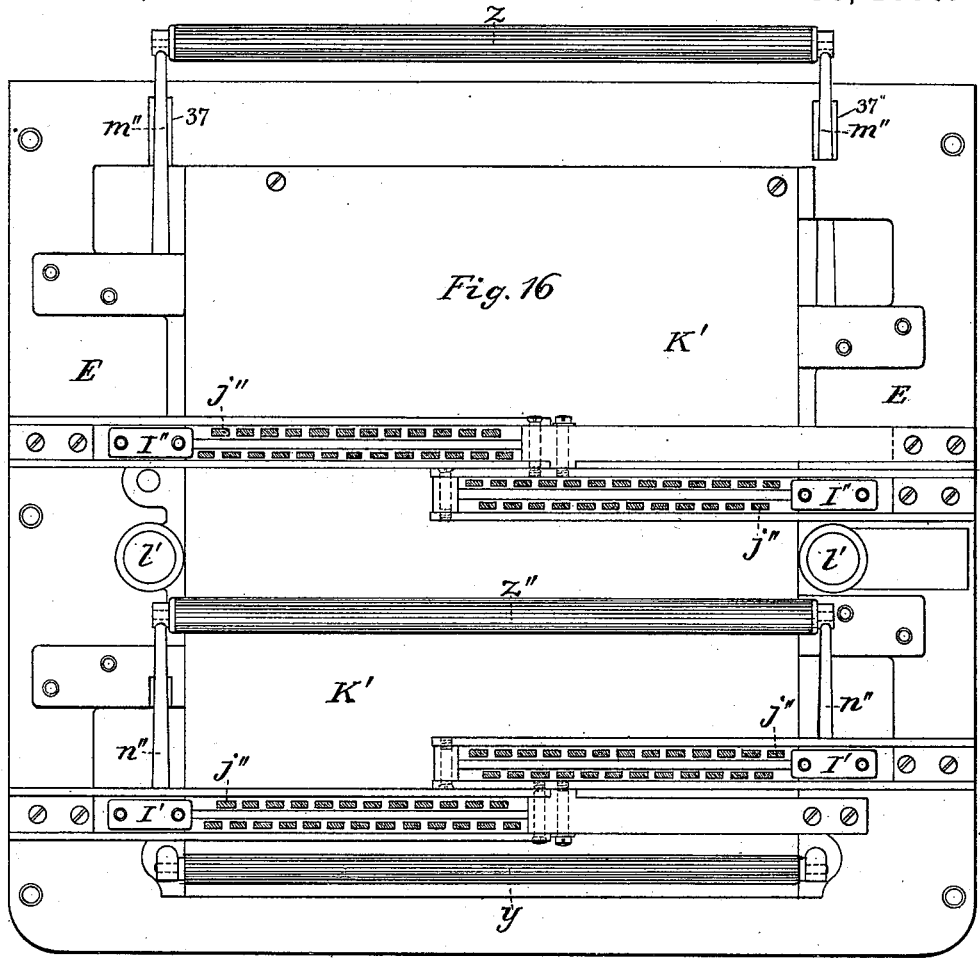
Figure 17:
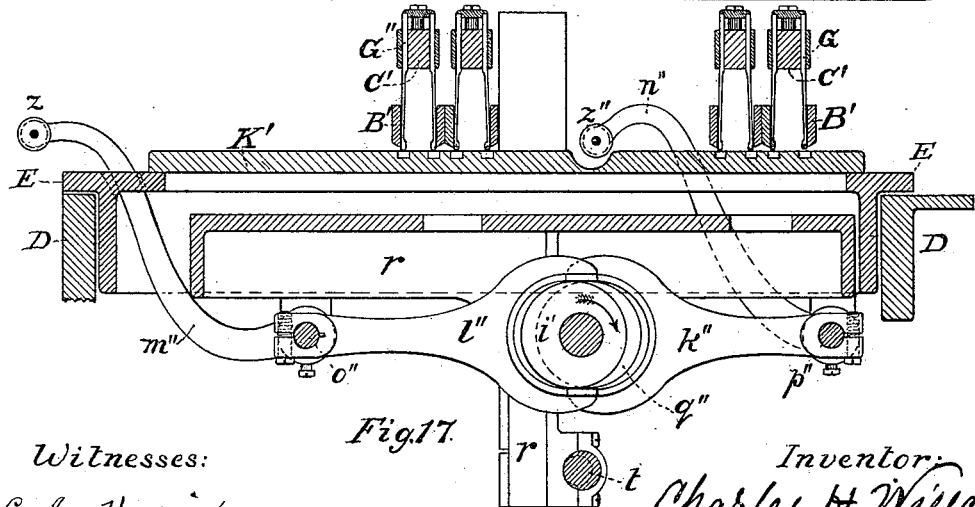
Figure 20:
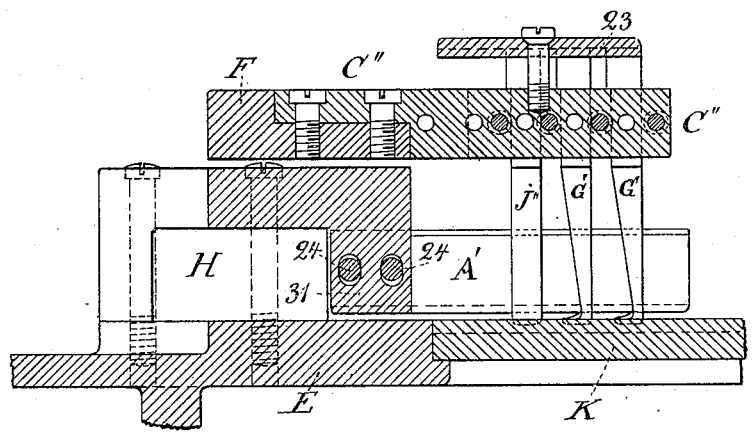
Figure 21:
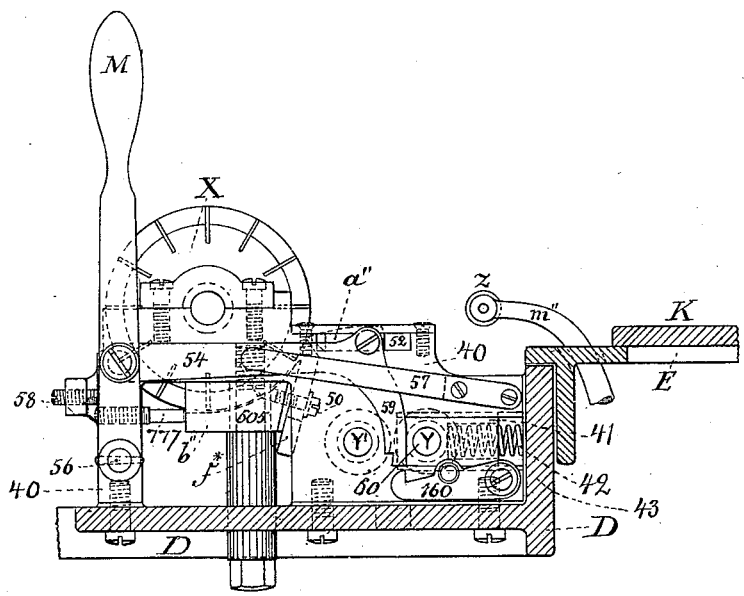
Figure 22:
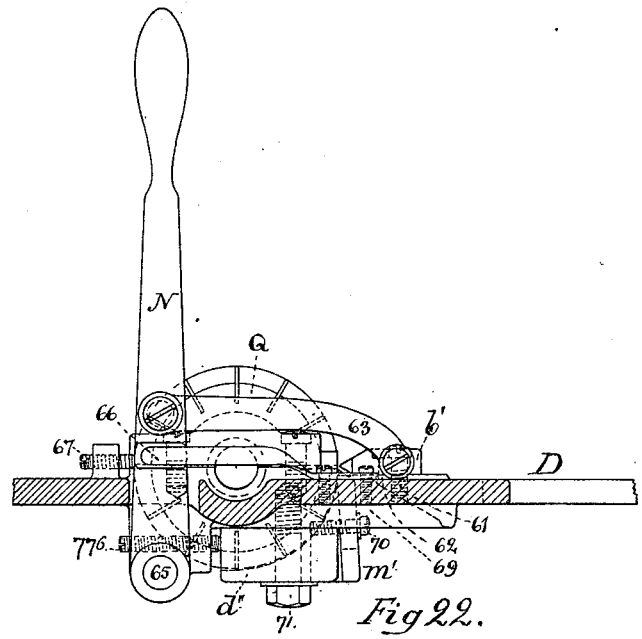

Figure 1 is a view in side elevation of the whole machine; Fig. 2, a front view of the same, the various driving-bands being omitted; Fig. 3, a plan of the same; Fig. 4, a plan showing the picker-frame and picker-slides with certain connected parts; Fig. 5, a vertical section through the axis of the shaft $t'$, Fig. 4, some parts being represented in elevation, and two of the picker-slides through which the plane of section passes being omitted; Fig. 6, a plan partly in horizontal section and Fig. 7 a sectional elevation, illustrating the arrangement of the pickers and stationary blade, with certain other parts of the picker mechanism; Fig. 8, a central vertical section (partly in elevation) through the picker mechanism transverse to the shaft $t'$, Fig. 4, simplified by the omission of certain parts through which the section passes; Figs. 9, 10, and 11, views in cross-section through the throat-plates and cutters for mowing off the loose threads after they have been cut; Fig. 12, a plan, partly in horizontal section, of one set of the feed-rolls; Fig. 13, a sectional elevation illustrating an adjustable guide-piece over which the lace passes between two of the mowing-cutters; Figs. 14 and 15, detail views illustrating the shape of the pickers, the mode of fastening them in their support, and the relative arrangement of the pickers and stationary blades; Figs. 16, 17, and 18, views illustrating a modified arrangement of the pickers; Fig. 19, a section in the plane of Fig. 8, showing parts not represented therein and omitting many of those which are there shown; Fig. 20, a detail view in section on line 122 123, Figs. 3 and 6, showing the mode of securing the pickers in the oblique rows, and also the oblique stationary blades to their respective supports; Figs. 21, 22, 23, 24, and 25, detail views of the mowing and feeding mechanism; Figs. 26, 27, 28, 29, and 30, detail views of the sewing-machine; Figs. 31, 32, 33, and 34, views illustrating a second modification in the arrangement of the pickers, which in some respects is preferable to that shown in Figs. 1 to 5.

The bed-plate D, upon which the feeding and lace-clipping mechanism is placed, is supported by the side frames, A. These frames are connected by the cross frame B, and the arm or bracket C, which is fastened at the bottom to the cross-frame B, supports the rear end of the frame D. The side frames, A, are also connected by the tie-bars $o\ q\ l$.

The shaft $p$ is journaled in the side frames. It is revolved by a driving-belt on the fast pulley $c$. The belt can be shifted onto the loose pulley $c^*$ when the machine is to be stopped. The belt-shipper may be of any ordinary construction. As shown, it consists of a shipper-bar, $e$, which slides upon the tie-bar $q$, and is prevented from turning by the arm $k$, which encircles and slides upon the tie-bar $o$. The treadle $v$, which is supported by and turns upon the tie-bar $l$, is connected by a wire, $x$, with the bell-crank $w$, supported and turning on the pin $100^*$, which is tapped into the hub 100, fixed on the bar $q$. The shipper-bar is connected by the wire 102 with the bell-crank $w$, and is drawn in the direction to start the machine (to the left in Fig. 2) when the treadle $v$ is depressed. When the treadle $v$ is released, the spring $j$, which is shown as a spiral compression-spring surrounding the bar $q$, expands and moves the shipper-bar $e$ to the right to change the belt from the fast pulley $c$ to the loose pulley $c^*$.

From the pulleys S, $f$, $f'$, and $n$, which are fast on the shaft $p$, motion is conveyed by belts to the different mechanism for feeding and clipping the lace. The picker-frame E is set in a square opening in the bed-plate D. (Shown in dotted lines, Fig. 3; see also Figs. 1, 7, and 8.) It is supported by its edges which overlap the bed-plate D, to which it is screwed fast.

The picker-frame itself has a central opening. (See Figs. 4 and 5.) The lace-plate K, Figs. 6, 7, and 8, rests upon and is supported by the parts 3 of the picker-frame at the edges of the central opening. It fits between the ribs 4, and is fastened in place by screws.

The lace-plate K is not perforated, but it is provided on its upper surface with numerous grooves, 5. Below the lace-plate is the movable bed $r$. It has lugs 6, (two of them at the bottom of the hangers $r^*$, making part of the movable bed,) by which lugs it is rigidly fastened to the sliding bars $l'$, movable vertically in the tubular bearings 7, making part of the picker-frame E. The movable bed $r$ is supported by the links $s$ from the cross-shaft $t'$, journaled in the bearings 9 on the picker-frame E. The links encircle at the top the eccentrics 10, fast on the shaft $t'$, and at the bottom they encircle the bar $t$, supported by the eccentric ends 11, (shown in dotted lines in Figs. 5 and 8,) which are held in bearings in the hangers $r^*$ with sufficient friction to prevent accidental turning of said bar. The shaft $t'$ is revolved continuously, while the machine is in motion, by means of a belt, 12, between the pulley S, fast on the shaft $p$, and the pulley U, fast on shaft $t'$. A rise and fall or complete vertical reciprocation is given to the movable bed $r$ at each revolution of shaft $t'$ through the eccentrics 10 and links $s$. The position of the bed can be adjusted vertically without altering the reciprocation by turning the bar $t$, the effect being due to the eccentricity of the ends 11.

On the opposite end of the shaft $t'$ is a disk, U', weighted on one side to balance the reciprocation of bed $r$ through eccentrics 10. The slides I and I', which carry the pickers G G, are supported on the bed $r$, being movable in ways thereon. The dovetail tongue 14, Figs. 5 and 7, on the bottom of each slide, fits between the guide-pieces 12, which are fastened to the bed by screws 13, which are inserted through slots in the overlying portion of the slide. (See Fig. 4.) The two slides I' are movable directly across the machine, while four slides, I, move in ways obliquely disposed. The two slides I' are connected by the links $k'$ with the wrist-plate D". The four slides I are similarly connected with the wrist-plate D'. The wrist-plate D" is supported (see Fig. 8) by the hanger $h''$, fastened beneath the bed $r$, the upright journals turning, one in said hanger, the other in a bushing, 15, set in a hole in the bed $r$. The wrist-plate D' is similarly supported by the hanger $h'$ and bushing 16. Each link $k'$ is connected with the corresponding slide (I or I') by a journal-pin, 17, in the end of the link, the same being tapped into the bottom of the slide, and passing through a slot, 18, in the bed $r$. The connection with the wrist-plate is made by a journal-pin, 19, in the other end of the link $k'$, said pin being fixed in the wrist-plate. The wrist-plates D' D" are vibrated by the ball-eccentrics $g'$, which are preferably made in one piece, as shown in Fig. 5, and which are fastened on the shaft $t'$. Retaining-disks $f''$ $f'''$ are fixed on the shaft $t'$ outside the eccentrics. The motion is conveyed to the wrist-plates D' D" by the links $e'$ $e''$, respectively, whose inner end encircles the eccentric, and whose outer end engages the ball 21 on the pin 20, which latter is tapped into the hub of the wrist-plate. The slides I I' are thus reciprocated simultaneously and continuously. Each of the slides at the end farthest removed from the wrist-plate has a standard made integral therewith, and therefore lettered the same as the slide, which standard projects through an opening in the top of the picker-frame E. To the standards of the two slides I' the arms C', Fig. 7, are bolted.

The pickers G, whose shape is shown in Figs. 14 and 15, are set in sockets in the sides of the overhanging arm C', fastened at its outer end by screws to the standard or the corresponding slide, I'. (See Fig. 7.) There are two rows of pickers, one on each side of the overhanging arm C', the pickers in one row being placed opposite the spaces in the other row. (See Fig. 6.) They are held in their sockets by plates 22, and are held down by the top plate, 23, fastened by screws to the arm C'. By removing the top plate one or all of the pickers can be drawn out.

At their lower ends the pickers have each a horizontal lifting-finger, which in action enters under the loose threads on the lace, as shown in Figs. 14 and 15. For different styles of lace these lifting-fingers are made of different widths. Thus where the lace is of a large mesh pickers with wider fingers are used. They should not be so small as to pass through the meshes of the ground fabric, nor so wide as not to enter the space under the loose threads. The bottom of the pickers is rounded, so that they will be less likely to catch in the body of the lace. Each picker also acts as a guard to the one behind it by holding down the lace in front of the picker-point. A dummy, $j''$, is placed as a guard at the end of the row, to prevent the lace turning up and catching on the point of the last picker. The picker-points are preferably turned outward, those in the two slides I' pointing in opposite directions. Under each row of pickers is one of the grooves 5 in the lace-plate.

Each horizontal lifting-finger is sharpened on top to form a cutting-edge on one side. The picker is thus also a cutter. In order to insert the lifting-fingers under the loose threads on the lace, the pickers are given a back-and-forth movement lengthwise of the lifting finger in consequence of the reciprocation of the slides I' on the bed $r$, and also a rising-and-falling motion in consequence of the rising and falling of the said slides I' with the said bed $r$. The two movements are so timed that, first, the pickers are brought down, depressing the lace into the grooves 5, causing the loose threads to buckle up between the pickers; secondly, they are moved outward to insert the lifting-fingers under the loose threads; thirdly, they are raised, cutting the loose threads under which the lifting-fingers have been inserted; and, lastly, they are moved inward to their first position.

The action of the pickers G in cutting the loose threads is assisted by stationary blades B', of which there is one to each single row of pickers. They are sharpened on the bottom, and in connection with the cutting-pickers form shears, there being of course as many pairs of shears or scissors as there are pickers. Thus the loose threads are cut without drawing at all on the fabric, as would be the case if the pickers were made to act like a knife. To further assist the action of the cutters, (i. e., the pickers and the stationary blades,) the pickers are made thin between the lifting-fingers and the shanks, which are held in the overhanging arm, so as to be elastic and slightly flexible. When the stationary blades are in place, the lower ends of the pickers are forced in slightly, and the elasticity of the pickers then presses their lower ends against the stationary blades. The stationary blades are preferably placed on opposite sides of the double row of pickers, as shown, so that the pressure of the pickers on one side of the arm C' opposes and neutralizes that of the pickers on the other side.

The stationary blades B' are fastened at their outer ends to the blocks 25 by horizontal screws 24, which pass through one blade, and also through the block, and are tapped into the blades on the opposite side. (See Fig. 6.) The blocks 25 are screwed fast to the picker-frame E. Each pair of blades at the ends farthest removed from the blocks 25 are fastened together by screws 26 27, respectively, a sleeve, 28, and the end of the bridge 29 being interposed. The bridge 29 is at the opposite end screwed fast to the picker-frame. It is also fastened by screw 30 to one of the blades B', whose ends are connected by the screw 26.

Figure 32:
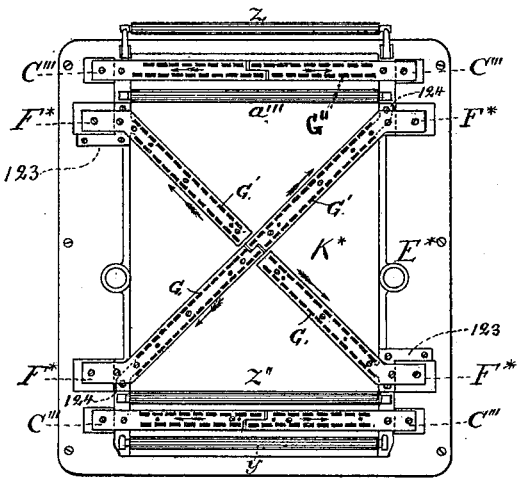

The pickers G', which are carried by the obliquely-disposed slides I, are the same as the pickers G, and are similarly placed between stationary blades A'. Instead of having the pickers G' in one long double row like the pickers G, which would be inconvenient in some respects, although entirely practicable, and is illustrated in Fig. 32, they are preferably arranged in a number of short double rows, as shown, each single row terminating in a dummy, $j''$, Fig. 20. The pickers are supported by plates F, Figs. 3 and 20, which are bolted to the standard on the corresponding slide, I, Figs. 4, 5, and 6. The pickers G' of each double row are held in sockets in arms C'' by face-plates, precisely as described for the pickers G with reference to Figs. 14 and 15, and they are similarly held down by top plates, 23. The arms C'' are screwed fast to the corresponding plate, F. The stationary blades A' are fastened to bosses 31 on the under side of the bridge-plate H by horizontal screws 24, the same as the blades B' are fastened to the blocks 25. The holes through which these screws 24 pass may be larger than the screws, as shown in Fig. 20, to allow a vertical adjustment of the stationary blades to take up wear. The bridge-plates H are fastened at the ends by screws to seats on the picker-frame E.

In front of the first row of pickers is a smoothing-roller, $y$, having bearings in the pieces 32, provided with cylindrical shanks, which are inserted loosely in holes 33 (see Fig. 4) in the picker-frame. Between the oblique sets of pickers is placed a roller, $a'$, (see Figs. 6 and 19,) whose journals turn in the upper ends of the links $v'$, which pass through holes in the picker-frame, and at their lower ends (see Fig. 19) are connected through the cross-bar $u'$ with arms $s'$ of the rock-shaft $p'$. This rock-shaft $p'$ is journaled in bearings fixed on the picker-frame E, and is vibrated by the eccentric $q'$ on the shaft $t'$ through the forked arm $k''$.

There is a groove, 36, across the lace-plate under the roller $a'$. The eccentric $q'$ depresses the roller $a'$ when the pickers G G' are raised, thus drawing down the lace into the groove 36. As they descend, the roller $a'$ is raised, leaving the lace loose, so as to be forced by the pickers G G' into the grooves 5 without danger of injuriously stretching the fabric. Back of all the pickers there is a roller, $z$, journaled in the arms $m''$ of rock-shaft $o'$, which is vibrated by the eccentric $i'$ on shaft $t'$ through the forked arm $l''$. The arms $m''$ pass through slots 37 in the picker-bed. The roller $z$ has a similar action to that of roller $a'$, just described. They take up more or less fabric at one time, (when the pickers are raised,) and give it out at another, (when the pickers are down.)

The throat-plate $a''$, which is about on a level with the lace-plate K, (see Fig. 11,) is supported at the ends by blocks 40, Figs. 1, 3, 21, and 24, on the bed-plate D. Below the throat-plate $a''$ are rubber-covered feed-rollers Y Y'. The roller Y is held against the other by yielding pressure. It is journaled at each end in a box, 41, pressed forward by the spring 42. (Shown as a spiral compression-spring interposed between the box 41 and the offset 43 of the bed-plate D.) The feed-roll Y' is journaled in stationary bearings, and is revolved by the belt on cone-pulley $d$ at the right of Figs. 2, 3, and 12. This pulley is fast on the shaft 48 of feed-roll Z, which shaft turns in stationary bearings, and is fastened to the shaft 49 of feed-roll Y' by means of a clutch or connector, 44, of ordinary construction. The only reason for using the clutch is facility of manufacture, it being easier to make and to place in position two short shafts than one long one.

Motion is conveyed to the pulley $d$ from the pulley $n$ on shaft $p$ through the crossed belt 45, extending from the pulley $n$ to the largest part of pulley T, which pulley turns on a stud fastened inside of one of the side frames, A, and the crossed belt 46, extending from the smaller coned part of pulley T to the pulley $d$. The effect of the different sizes of these pulleys is to make the shafts of the feed-rolls move very much slower than the shaft $p$.

The lace to be clipped is passed under the pressure-roller $y$, under the pickers G, under the first half of the obliquely-disposed pickers G', under the take-up roller $a'$, under the second half of the obliquely-disposed pickers G', under the take-up roller $z$, around the rear edge of throat-plate $a''$, and thence between the feed-rolls Y Y'. The feed-rolls draw the lace through the machine. They act continuously. When, however, the pickers are down, the feed of the lace is stopped. A part of the lace which has been taken up by the roller $z$ is then delivered to the feed-rolls, and prevents the latter from injuriously stretching the fabric. As the lace passes around the edge of throat-plate $a''$, the loose threads which have been cut by the pickers are mowed off by the action of the rotary cutter X, which co-operates with a stationary cutting-blade, $f^*$. The rotary cutter consists of a cylinder set around with a series of obliquely-disposed cutting-blades, as common in many classes of machinery. Its shaft is journaled in stationary bearing-blocks 40 on the bed D. It is revolved by belt 161 on pulley V. The stationary cutting-blade $f^*$ is fastened to a bridge, $b''$, by means of screws 50, passing through slots in the blade and tapped into the bridge. The bridge $b''$ is itself fastened by screws 605, Fig. 21, to the blocks 40, the screws passing through horizontal slots, which permit it to be adjusted nearer the axis of the rotary cutter X, in order to compensate for wear of the rotary blades. The adjustment is rendered more exact by means of set-screws 777, tapped through a part of the blocks 40, and bearing at the end against the edge of the bridge $b''$. The throat-plate $a''$ is also adjustable toward and away from the rotary cutter X. Its ends, instead of being screwed fast, play through slots 52 at the upper end of the blocks 40, and each end is connected outside the blocks by a journal-pin with the link 54, whose rear end is jointed to a lever-arm, M and 55, respectively, (see Figs. 3 and 24,) at opposite ends of a rock-shaft, 56, which latter turns in bearings of the blocks 40. A leaf-spring, 57, fastened at one end to one of the blocks 40, bears at its free end against the link 54, and produces sufficient friction to retain the throat-plate in the position to which it may be adjusted. The lever-arm M projects above the rotary cutter (see Fig. 1) and terminates in a handle for turning the same.

To prevent the throat-plate being moved too close to the rotary cutter X, a screw-stop, 58, is placed behind the lever-arm M. By adjusting the screw-stop the forward position of the throat-plate can be regulated. In inserting the lace the throat-plate is moved as far as possible from the cutters. In order that the same movement of the lever-arms M and 55 may also hold apart the feed-rolls Y Y', each of the links 54 has a toe, 59, which extends behind the journal 60 of the feed-roll Y, said journal projecting through the box 41. A catch, 160, hinged to one of the blocks 40 is turned up, as shown in Fig. 1, to engage the toe 59 of the link for that side of the machine when it is desired to hold back the feed-roll Y.

It is evident that when the lever-arm M is forward (to the right, Fig. 1) the throat-plate $a''$ is moved away from the cutters, and the feed-roll Y is separated from its companion roll, Y', so that it is easy to insert the lace properly. On drawing back the lever-arm the springs 42 return the sliding boxes 41 and the feed-roll Y, and the links 54 draw back the throat-plate $a''$ until the movement is arrested by the stop 58.

Behind the mechanism just described for mowing off the loose threads which have been previously cut by the pickers is a similar mechanism obliquely disposed. The throat-plate $b'$, Fig. 9, around which the lace is bent, is fastened to the bed-plate D by the screws 61, Figs. 3 and 22, which pass through slots 62 in the throat-plate $b'$, and are tapped into the bed-plate D. At each end the throat-plate is connected by a journal-pin with a link, 63, jointed to a lever-arm, N and 64, respectively, of the rock-shaft 65. The spring 66, pressing against the lever-arm N, retains the parts in whatever position they may be placed, while the screw-stop 67 limits their movement in the direction for bringing the throat-plate $b'$ toward the rotary cutter Q. This cutter, whose axis is parallel to the edge of the throat-plate $b'$, turns in stationary bearings, being revolved by the belt 68 (see Fig. 1) between the pulley R on the end of the cutter's shaft and the pulley $f$ on the shaft $p$. The stationary cutter-blade $m'$ is adjustably fastened to the bridge $d''$ by screws 70, passing through slots in said blade, and the bridge is adjustably fastened to the blocks 69, Fig. 22, on the under side of the bed-plate by the screws 71, the adjustment being made more exact by the screws 776.

To the right, Fig. 3, of the rotary cutter Q is a similar rotary cutter, Q', journaled in stationary bearings, and operated by a crossed belt, 73, between pulley $f'$ on shaft $p$ and pulley R' on the shaft of cutter Q'.

Figure 23:
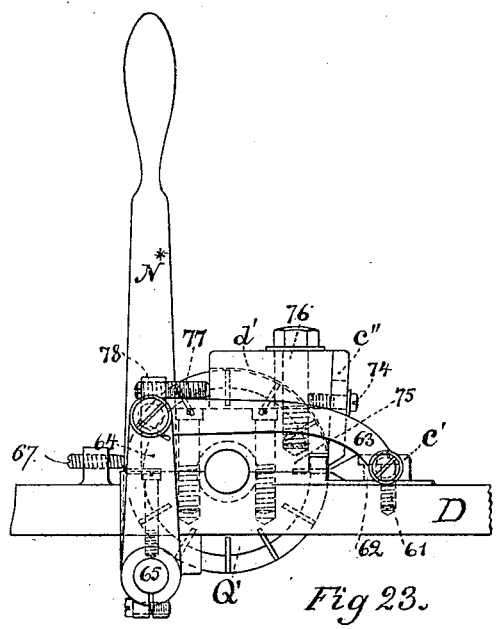
Figure 24:
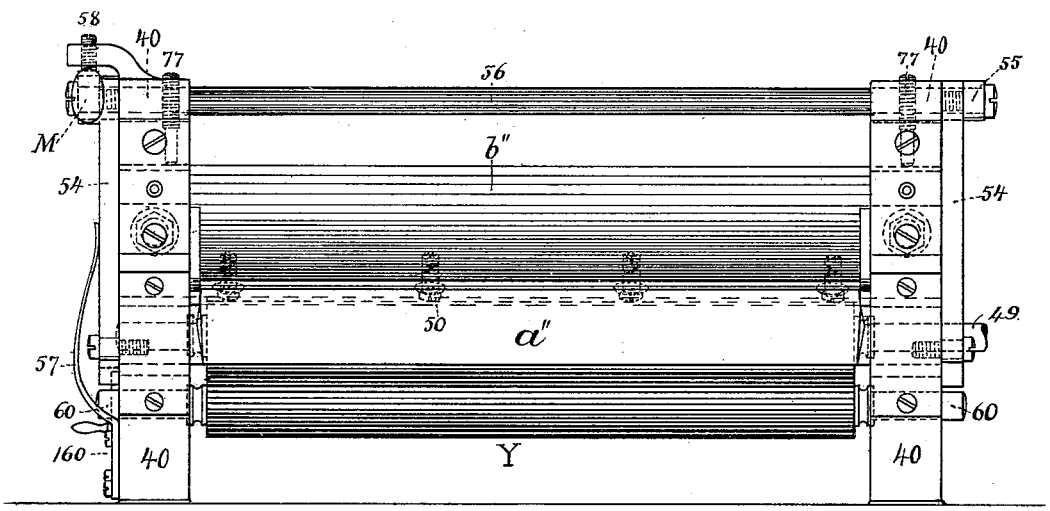
Figure 25:
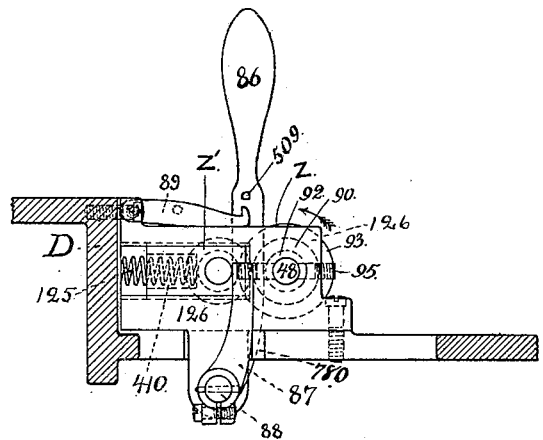
Figure 26:
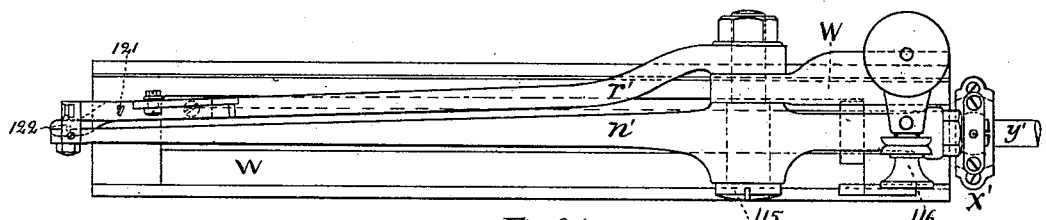
Figure 27:
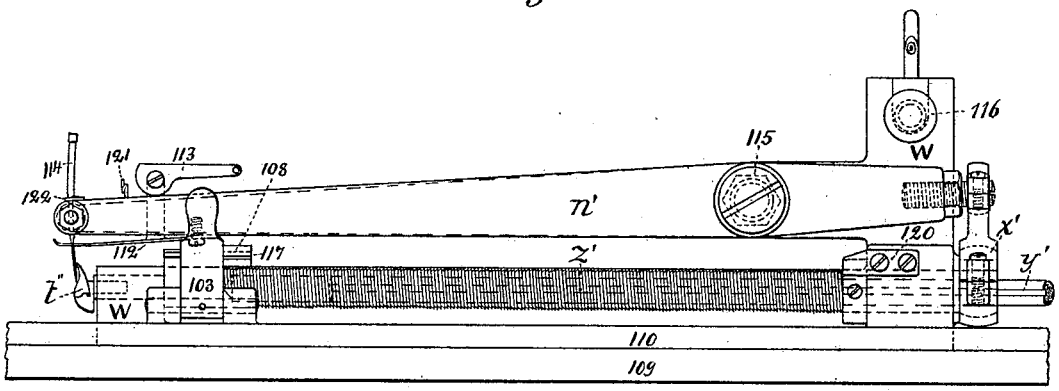
Figure 28:
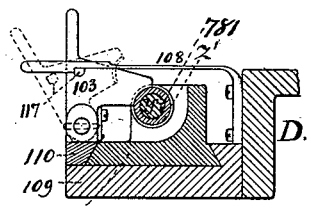
Figures 29, 30:
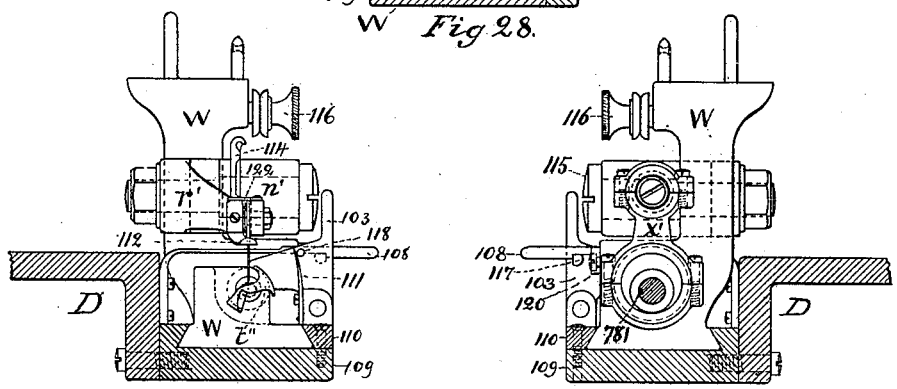

The stationary cutting-blade $c''$, Figs. 3, 10, and 23, is adjustably fastened to the bridge $d'$ by screws 74, and the bridge is adjustably fastened to the blocks 75 by the screws 76. Screws 77, tapped through lugs 78 of the blocks 75, bear at the point against the rear edge of the bridge and enable a nicer adjustment to be effected.

The throat-plate $c'$ is attached to the bed-plate, and is adjusted by means identical with those described for fastening and adjusting the throat $b'$, and which are similarly numbered or lettered, except the operating-lever, which is lettered N* instead of N.

Between the two obliquely-arranged cutting mechanisms is a guide-piece, $g''$. (See Fig. 13.) A spiral tension-spring, $i''$, connected at the top with the stationary pin 80, supports the guide-piece. There is a groove, 81, in the bottom of the bed-plate D, just over the guide-piece, equal in width to the thickness of its upper edge. In this upper edge there are notches 82 near the ends of the guide-piece. Screws 83 are tapped through the bed-plate, so that their lower ends project into the groove 81. The notches 82 engage the ends of the screws 83 whenever the corresponding end of the guide-piece rises.

P is a segment of a ring held between and guided by the side plates, 84, which are bolted to the bed-plate D. Tongues on the sides of the segment fit into grooves in the side plates. A screw, 85, is tapped into each end of the segment, and when the latter is turned the end of the screw enters a groove, 86*, in the upper edge of the guide-piece $g''$. Whenever the segment P is turned to the right, as shown in Fig. 13, it depresses the right end of the guide-piece. When it is turned in the opposite direction it allows the right-hand end of the guide-piece to rise until it enters the groove 81 and makes contact with the bed-plate, (the notch 82 at that end engaging the screw 83.) When, however, the segment is turned still farther to the left, it depresses the left-hand end of the guide-piece. The segment P is connected by the rod O with the lever L, by which it can be turned to any desired position.

It is preferred to retain the parts in the position to which they may be adjusted by friction.

The object of the guide $g''$ is to keep the lace in proper position between the throat-plates $b'$ $c'$. If it tends to slide toward either end of the throat-plates, the tendency can be corrected by adjusting the guide $g''$ in the proper direction.

The lace to be clipped, after passing between the feed-rolls Y Y', is carried over and around the throat-plate $b'$, (see Figs. 3 and 9,) then across and under the guide $g''$, to and around the throat-plate $c'$, Fig. 10, and thence over the feed-roll Z, between it and the corresponding feed-roll, Z'. The course is represented in Fig. 3 by the dotted lines 642 and 643, which represent the two edges of the strip of lace. In passing over the throat-plates $b'$ and $c'$ the lace is folded obliquely, the fold lying, of course, in the direction of the edge of the throat-plate. The feed-roll Z' is mounted in sliding boxes 410, held in place by springs 125, the same as before described with reference to the feed-roll Y. It can be moved away from the feed-roll Z by means of the lever-arms 86 and 87, connected by a rock-shaft, 88, Figs. 12 and 25, and arranged just behind the projecting journals of the feed-roll Z'. A catch, 89, pivoted at one end to the bearing-block 126, catches against a pin, 509, on the lever-arm 86, and retains it in position when the feed-roll Z' is moved away from its fellow roll, Z.

The rolls Y Y' Z' are ordinary rubber-covered rolls, fast on their respective shafts. The roll Z is, however, connected with its shaft by friction. It consists (see Fig. 12) of a rubber-covered metal tube, 90, with hubs 91 and 92, of metal, slipped into the ends and there riveted. The shaft 48 passes freely through these hubs. The hub 92 has a peripheral flange, 93. Two radial holes are drilled through the flange from opposite sides. In each hole is set a friction-plug, 94, of leather or other suitable material. A screw, 95, tapped into each hole forces the plug 94 with more or less pressure against the shaft 48. The feed-roll Z is thus carried with the shaft 48, and feeds the lace at its own surface speed until there is a drag exceeding the friction on the shaft, whereupon the shaft 48 turns independently. The rolls Z Z' have, therefore, the double function of tension and feed rolls. The roll Z is made of larger diameter than the feed-roll Y', so that, although carried by shafts 48 and 49, which revolve at the same speed, it tends to feed the lace faster, and thus constantly keeps the lace taut between the two pairs of feed-rolls. The tension, which is light in order not to injure the lace by stretching, is adjusted by turning the screws 95.

The devices described constitute all of the machinery for clipping lace, this when clipped passing out through an opening, 780, (indicated in dotted lines, Fig. 25,) in the bed-plate into a receiver beneath. As, however, the lace comes in comparatively short lengths, it is very desirable to have some ready means of attaching the different lengths together, so that the lace may be drawn continuously through the machine. For this purpose a sewing-machine is placed at the front of the bed-plate D, and it is so constructed and arranged that it can be fed across the overlapped ends of the lace, in order to stitch the front end of a fresh length to the last end of the preceding length, which is about passing under the pickers.

The sewing-machine frame W (see Figs. 1 to 3; also Figs. 26 to 30) slides in ways 109 and 110, attached to the bed-plate D. The main shaft of the machine consists of a sleeve, $z'$, and a core, $y'$, connected with said sleeve by spline and groove 781, so that the two turn together, while at the same time the sleeve can be moved endwise on the core. The core is journaled in stationary bearings, and on it is keyed the pulley $b$. By a belt running to this pulley $b$ from pulley $a$ motion is conveyed to the sewing-machine shaft. The pulley $a$ is loose on a sleeve, 97, so as to turn freely thereon, and the said sleeve slides on the tie-rod $q$, being connected therewith by a pin, 96, fixed in the tie-rod and projecting through a slot in the end of the sleeve, so as to prevent its turning.

On the side (left side, Fig. 2) of the pulley $a$ is a beveled friction-hub, 98, which, when the pulley is moved in the proper direction, (to the left in Fig. 2,) makes contact with a similar friction device, 99, on the loose pulley $c^*$. The pulley $a$ is held off by the spiral compression-spring $m$, except when the sleeve 97 is drawn to the left, Fig. 2, by the depression of pedal $g$, which is journaled on the tie-rod $l$, and is connected with the sleeve 97 through the bell-crank $h$, (pivoted to sleeve 2 on the tie-rod $q$,) the cord or wire $g^*$, (connecting the pedal with one arm of the bell-crank,) and the cord or wire $h^*$, (connecting the other arm of the bell-crank with the sleeve 97.)

Since the sewing-machine is to be driven from the loose pulley $c^*$, it is evident that it can only be operated when the clipping-machine proper is stopped.

In order to effect the feed of the sewing-machine across the lace-clipping machine, the sleeve $z'$, which is journaled at the ends in the sewing-machine frame W, is provided with an exterior screw-thread which engages the half-nut 103, pivoted to lugs on the guide 110. The object of using a half-nut is, that it may be removed to disengage the screw-thread on the sleeve $z'$, and thus allow the sewing-machine to be drawn back after it has been fed across the work and a line of stitching finished.

The sewing-machine shown is of the chain-stitch or Willcox & Gibbs type. The stationary arm $r'$ and needle-arm $n'$ are fastened to the frame W by the bolt 115, on which the needle lever turns. The tension 116 and spool-pin are on top of the standard, making part of frame W. The looper $t''$ and the eccentric for operating the needle-lever $n'$ through the eccentric-rod $x'$ are mounted on opposite ends of the sleeve $z'$, outside the latter's bearings in the sewing-machine. The stationary arm $r'$ carries the presser-foot 112 and its lifting-cam 113, the thread-guide 121, and take-up post 114, to co-operate with the take-up 122 on the needle-arm. The slotted plate 105, fastened above an opening, 106, in the bed-plate D, serves as a throat-plate to the sewing-machine, the needle passing through the slot. For sewing the lengths of lace together the end of the new or entering length is placed under or above the other, the lap being above the throat-plate 105. They can be held in this position by hand, or a slotted clamping-plate, 107, Fig. 3, secured to the slotted plate 105, can be laid over the lapped ends and be held down by any suitable means. As shown, one end has two notches and is slipped under the heads of screws 128, while the other end has a deeper notch and is secured by the turn-button 129. When the clamping-plate is used it is less important to provide the sewing-machine with a presser-foot. The sewing-machine is started by pressing on the pedal $g$. After it has passed across the work, the machine is stopped by raising the foot from the pedal $g$. The nut 103, which is held in engagement by catch 108 and pin 117, is withdrawn and the machine run back by hand.

To prevent danger to the feed-screw by running the machine past the proper point, the wedge 120 is arranged to trip spring-catch 108, when the nut is disengaged by means of spring 111, which presses against pin 118. (See Fig. 29.) When two pieces of lace are thus stitched together, the one draws the other through the machine.

In order to introduce the lace when there is none in the machine, the several throat-plates $a''$, $b'$, and $c'$, and also the feed-rollers Y Z, are drawn back by their respective levers M, (operating throat-plate $a''$ and feed-roll Y,) N, (operating throat-plate $b'$,) N*, (operating throat-plate $c'$,) and 86, (operating feed-roll Z'.) The lace, or a strip of cloth sewed to the end of the lace, is then passed through the machine, as already described, and the throat-plates and feed-rolls are returned. The clipping machinery being started by pressing on the pedal $v$, and thus shifting the driving-belt onto the fast pulley $c$, the lace is fed slowly under the pickers G G', which cut the loose threads, ("floats" or "clips," as they are sometimes called,) and is also drawn around the edges of the throat-plates $a''$ $b'$ $c'$ past the several pairs of rotary and stationary cutters, which mow off the ends of the loose threads, which, when the threads were cut, remained attached to the lace.

Owing to the number and arrangement of the pickers and cutters, and the slowness of the feed, it is practically impossible, except, perhaps, in very difficult figures of lace, for any of the loose threads to escape the action of the cutting-pickers and the mowing-off mechanism. In lace where all the loose threads run lengthwise of the fabric it is unnecessary to have obliquely-disposed cutting-pickers and mowing-off mechanism; but when the loose threads run across the fabric, as well as lengthwise of the same, and therefore are apt to escape the action of the pickers moving nearly parallel with such loose threads, it is important, to insure perfect work, to use the obliquely-disposed pickers. The angle at which the latter are disposed need not be that of forty-five degrees, as shown, but may be varied at will.

The obliquely-disposed mowing mechanisms ($b'$ Q $m'$ and $c'$ Q' $c''$, respectively) are useful when there are oblique threads on the lace, because, unless the fabric is bent around an edge at right angles or approximately at right angles to the length of the cut threads, the ends are not thrown out as certainly as they should be, and some of them may escape the mowing action of the rotary cutter.

When there are no oblique threads, the lace can be taken off through the bed-plate D at once, after passing between the first pair of feed-rolls, Y Y', as shown in full lines, Fig. 11.

In the machine shown it is easy to change the direction of the pickers' motion, so that this will be in the line of the feed, at right angles to the same, or at any intermediate angle. For this purpose it will be necessary to change the position of the guide-pieces 12, which can readily be done, as they are held only by screws; to properly arrange the bracket on the slide, the overhanging arm or arms on the bracket, and the cutting-pickers in the overhanging arm or arms, and also to place the journal pin with which the link $k'$ is connected at the proper place on the wrist-plate. A modification of this kind is shown in Figs. 16, 17, and 18. The obliquely-disposed slides I, with their adjuncts, are replaced by the cross-slides I'', with corresponding parts. As these slides and their pickers are or may be like the slides I' in all respects except their relative position in the machine, further description is unnecessary. The second set of cross-pickers are lettered G'', the lace-plate K'. Instead of the take-up bar $a'$, a bar, $z''$, is employed. It is carried by the arms $n''$ of rock-shaft $p''$, and is actuated by the eccentric $q''$ through the forked arm $k''$.

Figure 31:
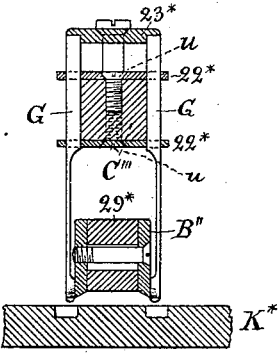
Figure 33:
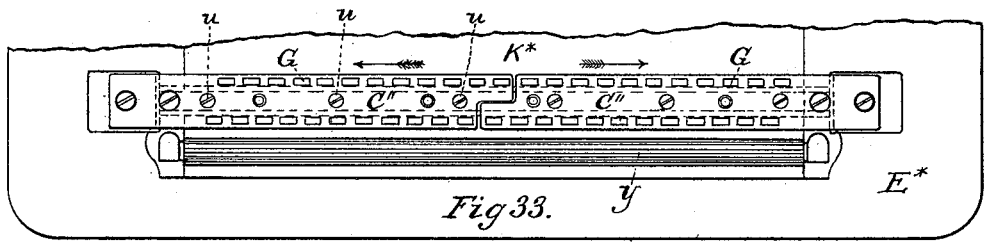
Figure 34:
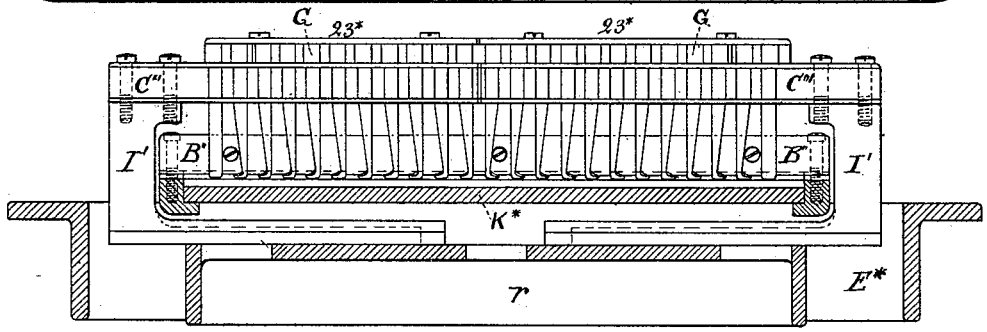

In Figs. 31 to 34 another mode of securing the pickers in place is represented. Referring particularly to Fig. 31, the stationary blades B'' are placed between the double row of pickers G, instead of outside of the same, as shown in previous figures. They are fastened to the bridge 29*. The pickers have the inner edge of the lifting-fingers sharpened, and the elasticity of their middle portion tends to press the lifting-fingers inward instead of outward. The shanks of the pickers fit in holes in the plates 22*, fastened on the top and bottom of the arm C''' by screws u, the arm C''' being fastened to the bracket of the corresponding slide W, as shown for slides I in Fig. 34. The pickers are held by a plate, 23*. The rows of pickers on each pair of slides are or may be in line with each other, and where possible the stationary blades B'' and their bridges 29* extend the full width of the machine. The grooves 5 then extend continuously across the lace-plate K*. Instead of having the ends of the arms C''' abut squarely, they are made to overlap, as shown in Figs. 32 and 33, so that the end pickers on the two slides are opposite each other. The object of this arrangement is more effectually to cover the whole surface of the lace. The oblique series of pickers G' are fastened to arms F*, the same as the pickers G to the arms C'''. The arms F* are attached to obliquely-disposed slides, constructed and operated like the slides I of previous figures. The oblique stationary blades are fastened to bridges 124 and 123, the same as the cross-blades B'' are to the bridge 29*. The bridge 124 extends across the lace-plate, and is fastened at both ends to the picker-frame E*. The bridges 123 are necessarily separated, and are fastened to the pillar-frame at one end only.

In the arrangement shown in Fig. 32 there is a second set of cross-pickers, G'', supported and operated in the same manner as the first set, G. The object of using the second set is to insure the cutting of any floating threads which may be released by the cutting of overlying oblique threads, by means of the obliquely-disposed picker G'. A take-up bar or roller (z'', a''', and z, respectively) is arranged after each set of pickers. They are operated like the take-ups before described.

It is obvious that other modifications can be made in details without departing from the spirit of the invention, and that parts of the invention can be used separately.

Having now fully described my said invention, and the manner in which the same is or may be carried into effect, what I claim is—

1. The combination, with the lace-plate and feed-rolls, or the fabric supporting and advancing means, of the pickers movable obliquely to the movement of the fabric, said pickers having lifting-fingers for entering beneath the loose threads to be clipped, substantially as described.

2. In combination with the fabric supporting and advancing means, the series of pickers arranged at different angles with respect to the movement of the lace or fabric to be clipped, substantially as described.

3. The combination, with the pickers of a clipping-machine, of a take-up for drawing in fabric when the pickers are out of action, and afterward giving up the same to be drawn in by the pickers, substantially as described.

4. The combination, with the pickers of a clipping-machine and the continuously-acting feed-rolls, of a take-up for acting upon the fabric between the feed-rolls and the pickers, substantially as described.

5. The combination, with the throat-plate around which the fabric bent over the edge thereof is to be drawn, of cutters for mowing off the loose threads, said throat-plate and cutters being set obliquely to the movement of the said fabric, substantially as described.

6. The combination, with a supporting-frame, of two mowing mechanisms arranged at an angle one to the other, and comprising each a throat-plate and cutters, and feeding mechanism for feeding the fabric successively between the throat-plate and cutters of the two mowing mechanisms, substantially as described.

7. The combination, with the fabric supporting and feeding means of a clipping-machine, of mowing mechanisms arranged at different angles to the line of feed, and comprising each a throat-plate and cutters, substantially as described.

8. The combination, with the fabric supporting and feeding means of a clipping-machine, of pickers and cutters for cutting the loose threads, arranged obliquely to the line of feed, and devices for mowing off the cut threads, also arranged obliquely to the line of feed, substantially as described.

9. The combination, with the fabric supporting and feeding means of a clipping-machine, of pickers and cutters for cutting the loose threads, arranged at different angles to the movement of the fabric, and mowing mechanisms, also arranged at different angles to the said movement, substantially as described.

10. The combination of two sets of feed-rolls and the mechanism for acting upon the fabric between the said sets with mechanism for revolving said feed-rolls, the second set at the greater surface speed, said mechanism including a friction device for engaging the said second set of rolls, whereby they act to keep the fabric stretched between the two sets of feed-rolls, substantially as described.

11. In combination with the slotted lace-plate, a series of pickers carried by a common support and having lifting-fingers for entering beneath the loose threads, and means whereby said common support can be moved so as to operate said pickers simultaneously, substantially as described.

12. The combination, with a series of pickers having lifting-fingers provided on top with cutting-edges, of a blade common to and cooperating with the series of pickers, and arranged at the side of and above said lifting-fingers, and operating means, substantially as described.

13. The combination, with the slotted lace-plate, of a slide, means for moving said slide, an arm attached to said slide and overhanging said lace-plate, and a series of pickers attached to said arm, substantially as described.

14. The combination, with the slide, the overhanging arm, and the pickers attached to said arm, of the vertically-movable bed, whereon the said slide is supported, and means whereby said slide and said bed can be operated, substantially as described.

15. The combination, with the vertically-movable bed, of picker-slides mounted in ways on said movable bed and mechanism for operating said bed and said slides, substantially as described.

16. The combination, with the movable bed and the links and eccentrics for reciprocating the same vertically, of picker-slides mounted on said bed and eccentrics and connections for reciprocating said slides, substantially as described.

17. The combination, with picker-slides, of a wrist-plate, the links between the wrist-plate and slides, and an eccentric and connections for vibrating said wrist-plate, substantially as described.

18. The combination, with the movable bed and the eccentrics and links for moving the same up and down, of picker-slides on said bed, a wrist-plate, the links between the wrist-plate and the slides, and the eccentric and links for vibrating said wrist-plate, substantially as described.

19. The combination, with a series of pickers and a common support to which the pickers are attached, of mechanism for giving a rising-and-falling and back-and-forth movement to said support, substantially as described.

20. The combination, with the pickers of a clipping-machine, of mechanism for giving a back-and-forth and also a rising-and-falling motion to said pickers, said mechanism comprising the vertically-movable bed and the picker-slides movable in ways on said bed, in connection with the means for reciprocating the said bed and slides, substantially as described.

21. The combination of the grooved lace-plate, the pickers, the overhanging arms to which said pickers are attached, the picker-slides, the movable bed, and the eccentrics and connections for reciprocating said bed, and also for reciprocating said slides on said bed, substantially as described.

22. The combination, with the series of cutting-pickers, an overhanging arm forming a common support to which the cutting-pickers are fastened, and the mechanism for giving a back-and-forth and also an up-and-down motion to said support, of one or more stationary cutting-blades co-operating each with more than one picker, substantially as described.

23. The combination, with the picker-frame, lace-plate, cutting-pickers, and a common movable support to which the pickers are fastened, of co operating cutting-blades projecting over the lace-plate and alongside the said cutting-pickers, substantially as described.

24. The combination, with the stationary blade and the rotary cutter, of the movable throat-plate and lever and connections for moving it toward and away from said cutter, substantially as described.

25. The combination, with the movable throat-plate and the movable feed-roll, of the mechanism for moving them simultaneously, substantially as described.

26. The combination, with the pairs of feed-rolls, one roll of each pair being movable away from the other, of mowing mechanisms comprising each a throat-plate and cutters, the throat-plate being movable away from the cutters, and the levers and connections for moving the feed-roll away from its fellow and the throat-plate from the cutter, substantially as described.

27. The combination, with the two throat-plates arranged at an angle to each other, of the intermediate adjustable guide-piece around which the fabric is led, substantially as described.

28. The combination, with the guide-piece and the spring for holding it up, of the movable segment for adjusting the position of the guide-piece, substantially as described.

29. The combination, with a feed-roll and its shaft, of a second feed-roll having its shaft in line with and coupled to the shaft aforesaid, the said second feed-roll having the larger diameter, and being composed of a sleeve connected by friction with its shaft, substantially as described.

30. The combination, with the lace-clipping machine, comprising feeding mechanism for advancing the fabric to be clipped lengthwise through the machine and the clipping mechanism for removing the loose threads therefrom, of the sewing-machine movable in ways at the front of the machine across the fabric, for stitching together the ends of different lengths, substantially as described.

31. The combination, with the sewing-machine movable lengthwise of its stationary arm for sewing together lengths of fabric at the ends, and the machine for operating upon the fabric, the same having feed mechanism for moving the fabric transverse to the movements of the sewing-machine, of driving mechanism, combined and arranged as described, whereby the feeding of the said fabric is arrested when the sewing-machine is brought into action, substantially as set forth.

32. The combination, with the mowing-off cutters, of the throat-plate, the lever and links for moving the same toward and away from the cutters, and the screw-stop for regulating the closeness of the edge of said throat-plate to said cutters, substantially as described.

33. A double row of pickers, in combination with two stationary blades arranged between or on opposite sides of the double row of pickers, substantially as described.

34. A spring-cutting picker consisting of a shank to be secured in a socket, an elastic and flexible middle portion of less thickness than said shank, and a lifting-finger of greater width than the thickness of said middle portion having a cutting-edge, substantially as described.

35. The combination of a movable spring-picker having a lifting-finger provided with a cutting-edge, in combination with a stationary co-operating blade and means for operating said picker, substantially as described.

36. A series of movable spring-pickers having lifting-fingers provided each with a cutting-edge, in combination with a stationary blade common to and co-operating with the series of spring-pickers and means for operating said pickers, substantially as described.

37. A double row of spring-pickers having lifting fingers provided each with a cutting-edge, the cutting-edges being formed on opposite sides of the lifting-fingers in the pickers of the two single rows, in combination with means for operating said pickers and co-operating stationary blades, substantially as described, so that the elastic pressure of the pickers of the two rows against the stationary blades is in opposite directions, as set forth.

38. A row of pickers having the horizontal lifting-fingers in the same line and pointing in the same direction, in combination with mechanism for giving an up-and-down and back-and-forth movement to said pickers, one picker acting as a guard to hold down the fabric, and thus to keep the point of the lifting-finger behind from catching in said fabric, substantially as described.

In testimony whereof I have signed this specification in the presence of two subscribing witnesses.

CHAS. H. WILLCOX.

Witnesses:
PHILIP MAURO,
C. J. HEDRICK.